United States Patent [19]

Maciaszek

[11] 4,127,233

[45] Nov. 28, 1978

[54] APPARATUS AND METHOD FOR DISPERSING A LIQUID TREATING AGENT

[75] Inventor: Joseph A. Maciaszek, Broadview, Ill.

[73] Assignee: Nalco Chemical Company, Oak Brook, Ill.

[21] Appl. No.: 800,153

[22] Filed: May 25, 1977

[51] Int. Cl.² .............................................. B05B 7/00
[52] U.S. Cl. ...................................... 239/8; 239/434
[58] Field of Search .......................... 239/8, 433, 434; 137/604; 302/20, 66

[56] References Cited

U.S. PATENT DOCUMENTS

| | | | |
|---|---|---|---|
| 1,827,583 | 10/1931 | James | 239/8 |
| 2,077,257 | 4/1937 | Ofeldt | 239/8 |
| 3,137,446 | 6/1964 | Masuda | 239/434 |
| 3,146,951 | 9/1964 | Brown | 239/434 X |

*Primary Examiner*—Johnny D. Cherry
*Attorney, Agent, or Firm*—John G. Premo; Robert A. Miller; James Kinzer

[57] ABSTRACT

A liquid treating agent is dispersed by introducing it into a stream of air under pressure, attenuating the air-entrained liquid on the inside diameter of a conduit so the liquid will subdivide into unsuspended droplets when released through an opening, and releasing the attenuated liquid through a dispersing conduit preferably of smaller diameter so the droplets will be impelled forward, falling on the substrate.

12 Claims, 4 Drawing Figures

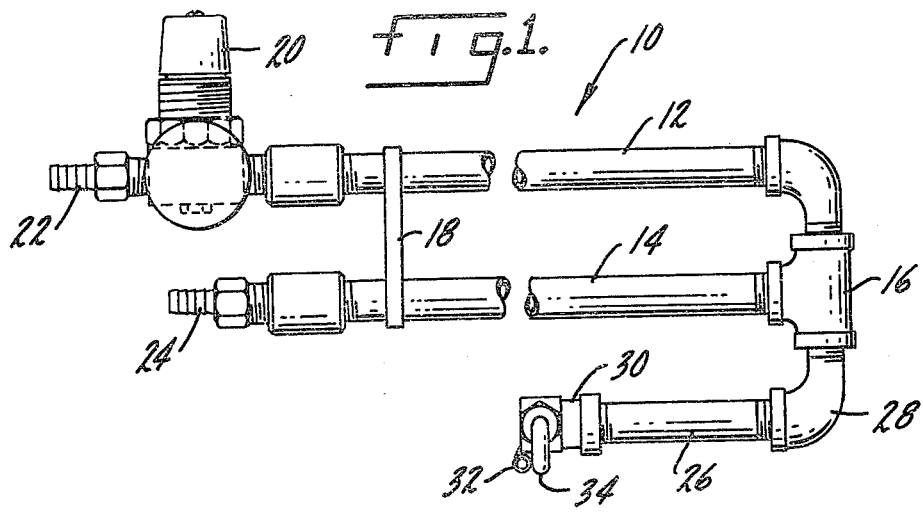
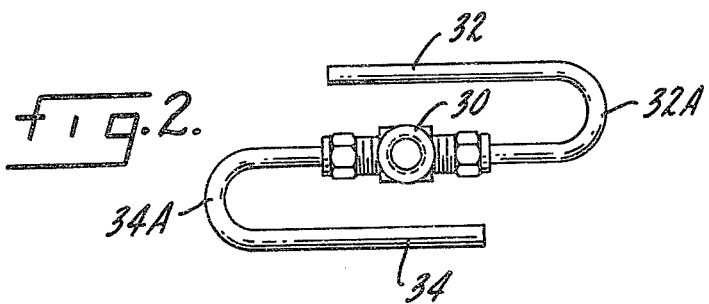
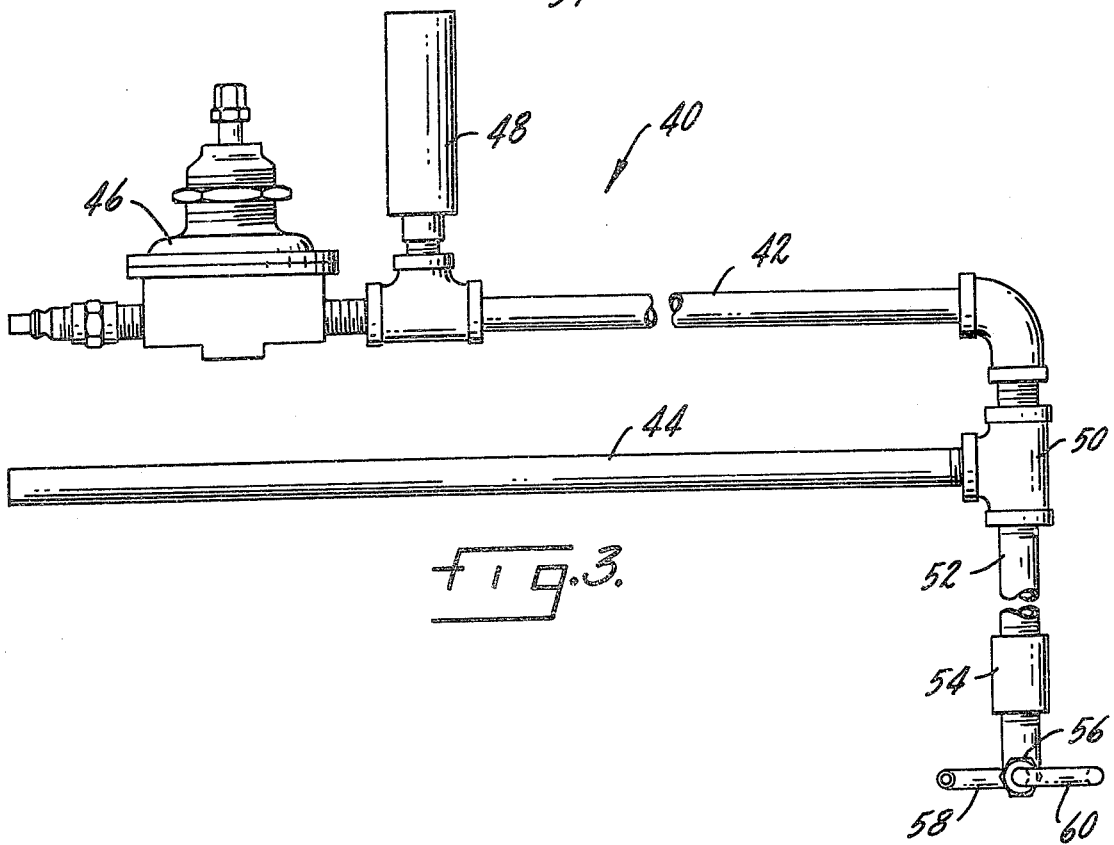

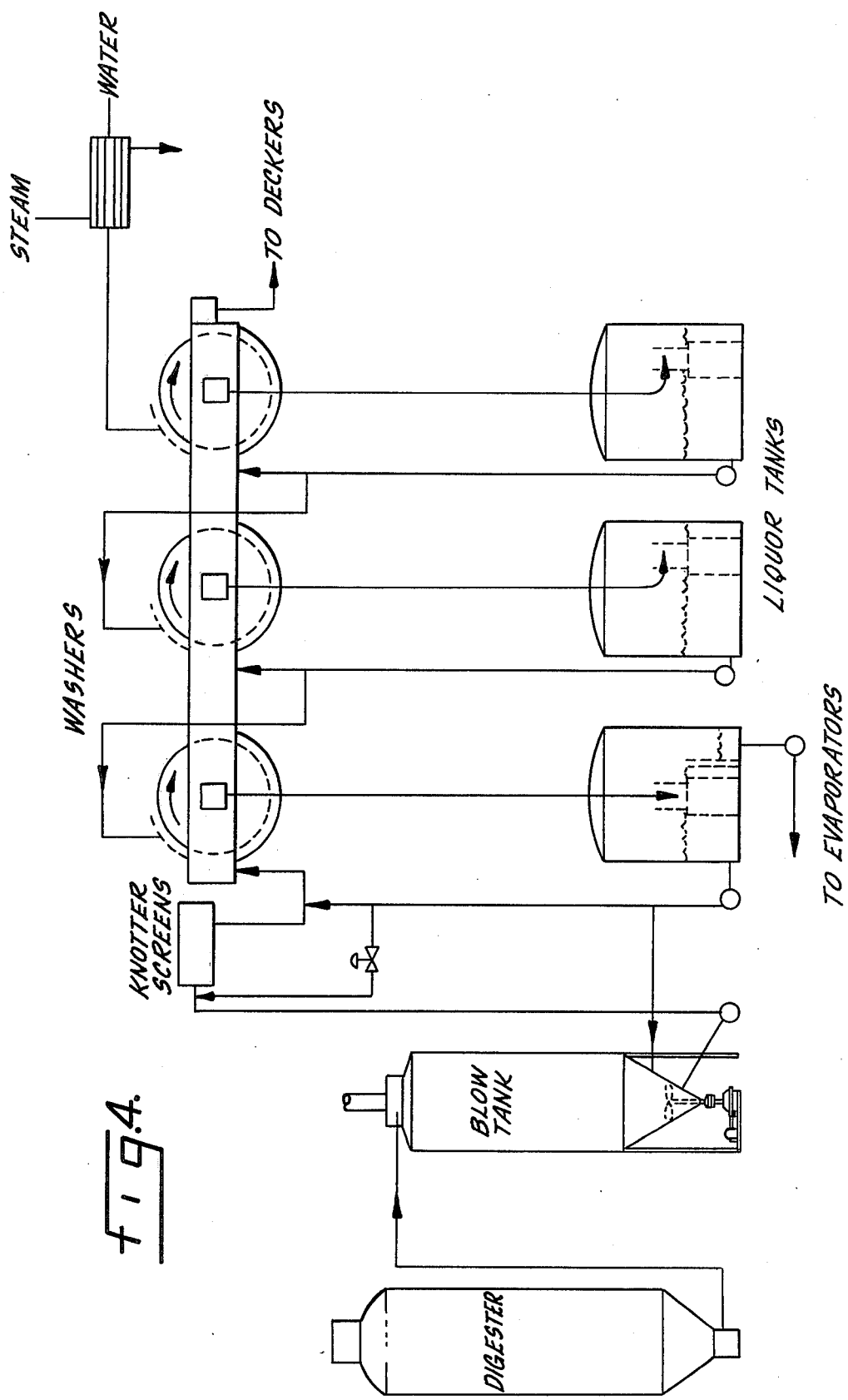

APPARATUS AND METHOD FOR DISPERSING A LIQUID TREATING AGENT

This invention relates to apparatus for dispersing a liquid treating agent in droplet form, falling on the substrate to be treated.

As will be explained in detail, one problem addressed is considerable inefficiency and difficulty in trying to distribute a treating liquid bodily, as a large dose, throughout the material to be treated thereby. An example occurs in treating a paper pulp slurry with an anti-forming agent for enhancing drainage efficiency. Another problem addressed under the present invention is that mechanical devices heretofore proposed for introducing the liquid are susceptible to plugging and some which are available produce a mist more likely to become entrained in the ambient atmosphere than in the material to be treated.

Th primary object of the present invention is to achieve the dispersal of a treating liquid by mechanical apparatus which (1) combines the liquid with a stream of air under pressure, (2) attenuates the entrained liquid so it will easily subdivide to droplet form and then (3) disperses the liquid as falling droplets, unsuspended in the air and therefore capable of falling directly on the substrate to be treated rather than misting above that substrate, attenuation being the result of employing a conduit of sufficient length to enable the entrained liquid to achieve sheeted form covering the inside diameter of the conduit, the sheet being swept along the air; and as the sheet continues to traverse the conduit internal resistance produces more and more attenuation. Another object of the invention is to use a smaller diameter conduit for final dispersal, thereby increasing the velocity of internal flow so the droplets will be impelled forward as they leave the dispersing conduit, meaning more area coverage. Another object of the invention is to employ conduits with bends to afford more resistance to flow thereby enhancing attenuation.

In the Drawing:

FIG. 1 is a plan view of one form of apparatus constructed in accordance with the present invention;

FIG. 2 is a detail view of the dispersing attachment;

FIG. 3 is a plan view showing another form of the invention;

FIG. 4 is a flow sheet.

The flow sheet in FIG. 4 shows the opening phase of preparing paper pulp. Wood chips are combined with pulping chemicals at the Digester and processed under considerable heat and pressure. The product, containing about ten percent pulp, is delivered to the Blow Tank, which is a holding tank servicing several Digesters. At the Blow Tank the pulp is diluted to about one to three percent and the diluted slurry is pumped to the Knotter Screens where the undigested wood is removed. Thereafter the pulp slurry is processed through a series of Washers (rotary screen drums) where the pulp is separated from the pulping chemical liquor, while additional water is added to wash the pulp. The resultant pulp (water slurry) is concentrated to a 10–16% solids weight and is delivered to the Deckers (not shown).

Drainage efficiency is of great importance during the washing step so the pulping chemical liquor (residue) will be removed rapidly and effectively. Foaming of the slurry retards drainage; consequently it is customary to add anti-foaming chemicals at any one of several locations down-stream of the Blow Tank and prior to transferring the pulp to the Deckers. They can be added for example to the slurry delivered from the Knotter Screens, to the pulp in any one wall of the Washer drums, or at any intermediate location.

To add the anti-foamer bodily as a dose is wholly unsatisfactory because it has to be spread, theoretically to contact each bit of pulp. Accordingly, the anti-foamer is combined with a wetting (surface-active) agent to assure scattering. Even so, there is often perverse behavior, which is to say scattering may work well at one location but not at all at another; it depends on the peculiarity of each system. Another difficulty is that the anti-foamer and its wetting agent cohort must be combined in critical amounts to avoid solubility. If the anti-foamer dissolves, as it easily can in a pulp slurry which contains some natural soaps, then the desired form of contact with the pulp bits is lost to the liquor. Problems such as these are overcome by dispersing the agent mechanically, employing apparatus constructed in accordance with the present invention.

One form of apparatus constructed in accordance with the present invention is shown at 10, FIG. 1, comprising a conduit 12 for air under pressure and a second conduit 14 parallel thereto for the treating liquid. The two conduits 12 and 14 are coupled to a Tee 16 so that the liquid (being pumped by a pump not shown) will become entrained in the air stream inside Tee 16.

The two conduits are supported in the parallel relation by a spacer 18. Preferably the air system includes a pressure regulator 20 downstream of the nipple 22 for the air hose, a similar nipple 24 being provided for the hose which delivers the liquid being pumped.

A third conduit 26 is joined to Tee 16 by an elbow 28. Conduit 26 at the opposite end is connected to Tee 30. A pair of dispersing conduits 32 and 34 are connected to the opposite sides of Tee 30 so as to be divergent.

In operation, the entrained liquid moving downstream from Tee 16 is attenuated, that is, is stretched out or sheeted so as to coat the inside diameter of elbow 28 and conduit 26. The greater the length of the conduit, the more internal surface area meaning more and more frictional resistance resulting in proportionally more attenuation. The bend represented by conduit 28 also offers internal resistance and accordingly more attenuation.

Additional resistance is encountered inside Tee 30 where the stream is divided for divergence to the two dispersing conduits 32 and 34 and of course the internal walls of the dispersing conduits 32 and 34 represent a further source of resistance resulting in more attenuation of the liquid film entrained in the air stream. Accordingly, when the air stream is released at the exit ends of the dispersing conduits 32 and 34 the liquid subdivides into droplets. Preferably, the inside diameter of the dispersing conduits 32 and 34 is appreciably smaller than that of the upstream conduit 26 and accordingly the velocity of the streams inside the dispersing conduits 32 and 34 is increased, resulting in forceful delivery of the droplets, at the time of release, accounting for dispersal over a wide area of the substrate being treated.

The length of the intermediate conduit 26, coupled with the effective length of the dispersing conduits 32 and 34, should be sufficient to achieve that degree of attenuation of the treating liquid which will produce the desired droplet form at the time of release but insufficient to result in misting of the liquid. Thus, if the liquid when released is misted or is in suspension in the air stream there will not be the desired form of droplet fall but rather the treating liquid will be wasted as a "fog".

Preferably the dispersing conduits 32 and 34 are provided with reverse bends at 32A and 34A, not only to achieve a wider dispersion of the falling droplets but also to offer further internal resistance enhancing attenuation of the treating liquid.

The actual form of the apparatus may vary considerably depending upon the nature of the treating liquid and the environment in which it is used and accordingly a second form is shown at 40 in FIG. 3, comprising an air conduit 42 and a liquid conduit 44. The air conduit is equipped with a pressure regulator 46 and a pressure gauge 48. The two conduits are joined and communicated at a Tee 50 where the liquid is merged into the air stream. Attentuation of that liquid takes place along the length of a third conduit 52 which is considerably longer than the conduit 26, FIG. 1, inasmuch as conduit 52 does not include a bend. Thus, by employing a bend as 28, FIG. 1, it is possible to employ a downstream conduit 26 of less length compared to the downstream conduit 52, FIG. 3.

Conduit 52 at the downstream end is connected to a pipe coupling 54 in turn connected to a Tee fitting 56 to which respective dispersing conduits 58 and 60 are connected as in the fashion of the embodiment described above.

It will be appreciated that the dispersing conduits themselves may be turned in the Tee to lie in any preferred plane and the bends as 32A and 34A may be made (or omitted) so that the release end points in a preferred direction.

It will be recognized from the foregoing that under the present invention a dispersing device has been developed for dispersing a treating liquid as fine droplets, falling by gravity, without the use of spray nozzles, inductors, pressure pumps or other special equipment. The device is not as susceptible to plugging, misting or malfunctioning as some of the known equipment. Nonetheless, an effective, forwardly impelled stream of droplets is created by employing a dispersing conduit of less inside diameter than the upstream conduit where attenuation is first commenced. It is not necessary to dilute the chemical treating agent and indeed higher concentrations may be employed compared to the dilution which results from using a wetting agent. Using pulp drainage rate as a basis, the present apparatus makes possible improved performance up to fifty percent compared to dispersing an anti-foamer with a wetting agent representing prior practice as discussed above.

I claim:

1. Apparatus for introducing a liquid treating agent into a stream of air, attenuating the liquid and then finally dispersing the liquid as droplets unsuspended in the air stream and therefore capable of falling directly on the substrate to be treated, said apparatus comprising a first conduit for a stream of air under pressure, a second conduit for delivering the liquid toward the air stream, said conduits meeting at a juncture where the liquid is introduced to and entrained in the air stream, a third conduit extending downstream from said juncture a distance sufficient to enable the entrained liquid to be sheeted about the inside diameter of the third conduit and thereby attenuated in preparation for dispersion, and a dispersing conduit connected to the third conduit for dispersing the liquid droplets unsuspended in the air stream, said dispersing conduit having a smaller inside diameter than the third conduit thereby to increase the velocity of the air stream for impelling the droplets forward.

2. Apparatus according to claim 1 wherein the third conduit has a bend for enhancing attenuation.

3. Apparatus according to claim 2 wherein the dispersing conduit has a bend therein further to enhance attenuation.

4. Apparatus according to claim 1 wherein the third conduit terminates at a second juncture where two dispersing conduits are connected in divergent relation to divide the air stream and offer further resistance for attenuating the liquid, each dispersing conduit having a smaller inside diameter compared to said third conduit.

5. Apparatus according to claim 4 wherein each of the dispersing conduits has a bend therein further to enhance attenuation.

6. A method of dispersing a treating liquid to a substance comprising: entraining the liquid in a stream of air under pressure and delivering the entrainment to a conduit where the liquid is attenuated on the internal wall of the conduit, and forcing the attenuated liquid through a conduit of smaller diameter having an exit opening where the attenuated liquid is released in unsuspended droplet form.

7. A method according to claim 6 where the stream, prior to release, is bent at least once to enhance attenuation.

8. Apparatus for introducing a liquid treating agent into a stream of air, attenuating the liquid and then finally dispersing the liquid as droplets unsuspended in the air stream and therefore capable of falling directly on the substrate to be treated, said apparatus comprising means for entraining the liquid in a stream of air and a conduit extending downstream therefrom a distance sufficient to enable the entrained liquid to be sheeted about the inside diameter of the conduit and thereby attenuated in preparation for dispersion, and a dispersing conduit connected to the first-named conduit for dispersing the liquid droplets unsuspended in the air stream, said dispersing conduit having a smaller inside diameter than the first-named conduit thereby to increase the velocity of the air stream for impelling the droplets forward.

9. Apparatus according to claim 8 wherein the first-named conduit has a bend for enhancing attenuation.

10. Apparatus according to claim 9 wherein the dispersing conduit has a bend therein further to enhance attenuation.

11. Apparatus according to claim 8 wherein the first-named conduit terminates at a juncture where two dispersing conduits are connected in divergent relation to divide the air stream and offer further resistance for attenuating the liquid, each dispersing conduit having a smaller inside diameter compared to the first-named conduit.

12. Apparatus according to claim 11 wherein each of the dispersing conduits has a bend therein further to enhance attenuation.

* * * * *